(12) United States Patent  (10) Patent No.: US 9,091,389 B2
Wong  (45) Date of Patent:  Jul. 28, 2015

(54) ADJUSTABLE WALL MOUNT FOR FLAT PANEL TELEVISION

(71) Applicant: Fuson Limited, Wan Chai (HK)

(72) Inventor: Chin Hung Wong, Wan Chai (HK)

(73) Assignee: Fuson Limited, Hong Kong (CN)

( * ) Notice: Subject to any disclaimer, the term of this patent is extended or adjusted under 35 U.S.C. 154(b) by 0 days.

(21) Appl. No.: 13/874,929

(22) Filed: May 1, 2013

(65) Prior Publication Data

US 2013/0320163 A1 Dec. 5, 2013

(30) Foreign Application Priority Data

May 31, 2012 (CN) .......................... 2012 1 0175711

(51) Int. Cl.
*F16M 13/02* (2006.01)
*F16M 11/10* (2006.01)
*F16M 11/18* (2006.01)
*F16M 11/20* (2006.01)
*F16M 11/04* (2006.01)

(52) U.S. Cl.
CPC ............. *F16M 13/022* (2013.01); *F16M 11/10* (2013.01); *F16M 11/18* (2013.01); *F16M 11/2014* (2013.01); *F16M 11/2092* (2013.01); *F16M 13/02* (2013.01); *F16M 11/04* (2013.01)

(58) Field of Classification Search
CPC ..... F16M 13/022; F16M 11/06; F16M 11/08; F16M 11/10; F16M 11/18; F16M 11/2007; F16M 11/201; F16M 11/2092

USPC ........ 248/274.1, 276.1, 277.1, 279.1, 292.12, 248/295.11, 919, 923, 125.8, 125.9, 284.1, 248/296.1; 361/679.01, 681, 683
See application file for complete search history.

(56) References Cited

U.S. PATENT DOCUMENTS

| 8,074,950 | B2 * | 12/2011 | Clary ....................... 248/280.11 |
| 8,094,438 | B2 * | 1/2012 | Dittmer et al. ........... 361/679.01 |
| 8,333,355 | B2 * | 12/2012 | Stifal et al. .................. 248/279.1 |
| 8,508,918 | B2 * | 8/2013 | Dittmer et al. ........... 361/679.01 |
| 2002/0179791 | A1 * | 12/2002 | Kwon ......................... 248/284.1 |
| 2007/0023599 | A1 * | 2/2007 | Fedewa ...................... 248/284.1 |

* cited by examiner

*Primary Examiner* — Tan Le
(74) *Attorney, Agent, or Firm* — Gloria Tsui-Yip, Esq.; Miskin & Tsui-Yip LLP

(57) ABSTRACT

A flat panel television adjustable wall mount having a wall mounting plate, a center rack assembly attached to the flat panel television, an extendable frame, and a telescopic adjustment mechanism attached to first and second struts. The telescopic adjustment mechanism includes a telescopic guided slider and a telescopic drive. The upper end of the first strut is pivotally connected to the wall mounting plate while its lower end is rotationally installed at the lower end of the telescopic guided slider. The lower rolling mechanism end of the second strut is set on the wall mounting plate while its upper end is rotationally connected to the center rack assembly. The telescopic drive activates the first strut and the second strut, allowing the center rack assembly with the flat panel television to extend out or retract back to the wall mounting plate to achieve an optimum viewing distance.

8 Claims, 17 Drawing Sheets

ADJUSTABLE WALL MOUNT FOR FLAT PANEL TELEVISION

TECHNICAL FIELD

This invention pertains to a flat panel television accessory, specifically; it pertains to an adjustable wall mount for flat panel televisions.

BACKGROUND

A flat panel television can be quickly mounted on the wall with a wall mount, because of its slim form, and minimum amount of space required, it is welcome by many people; particularly suitable for many areas such as living spaces at home, airport terminals, hotel lobbies, or hospital wards, etc. During the installation, the wall mount is first attached to the wall, and the flat panel television is then hung on the wall mount, securing the flat panel television to the wall. Since the flat panel television is attached to the wall mount that is fixed to the wall, the screen of the flat panel display remains immobile and cannot extend out or retract back to the wall, so the viewer cannot watch at an optimum viewing distance; it is also not possible to pan sideways or tilt up or down, therefore the viewer cannot watch at an optimum viewing angle, making it inconvenient to the user.

SUMMARY

The technical problems to be solved by the present invention is that, targeting the limitation of the current wall mount technology, to come up with an adjustable wall mount for the flat panel television, that allows the flat panel television to extend out or retract back, so that the user can view at an optimum distance.

This invention resolves the technical challenge with the following technical approach: to construct an adjustable wall mount for the flat panel television, including the wall mounting plate that is attached to the wall, the center rack assembly that the flat panel television is attached to, both the extendable frame and the telescopic adjustment mechanism with one end that is attached to the said wall mounting plate and the other end that is attached to the said center rack assembly; the said extendable frame includes the first strut and the second strut that are rotationally connected in the middle; the said telescopic adjustment mechanism includes the telescopic guided slider that travels up and down the said center rack assembly; the telescopic drive on the said center rack assembly that drives the said telescopic guided slider to glide relative to the center rack assembly; the upper end of the said first strut is connected to the wall mounting plate while its lower end is installed at the lower end of the said telescopic guided slider; the lower end of the said second strut is a rolling connection to the said wall mounting plate while its upper end is rotationally connected to the said center rack assembly.

In the adjustable wall mount of the present invention of the said flat panel television, the said center rack assembly includes the center frame that is rotationally connected to the upper end of the said second strut, the main shaft that is vertically and rotationally connected to the center frame; the said center frame is axially positioned on the upper end of the said main shaft, the said telescopic guided slider travels up and down the said main shaft and travels vertically relative to the center frame, the said telescopic drive is attached to the lower part of the center frame; the point of connection of the said flat panel television is attached to the said main shaft. The telescopic drive actuates the telescopic guided slider to travel up and down the main shaft, that is, same as traveling up and down relative to the center frame, thereby moving the extendable frame members to oppose or diverge, thereby the center frame and the main shaft moves away or closer to the wall mounting plate, enabling the flat panel television which is connected to the main shaft to extend out or retract in.

In the adjustable wall mount of the present invention of the said flat panel television, the said center rack assembly also includes the center post that is rotationally connected to the said main shaft and axially positioned at the lower end of the said center frame, the telescopic drive rack that is rotationally connected to the said main shaft and rotates in sync with the said center post; the said telescopic guided slider set within the said center post, the said telescopic drive is positioned on the said center post, and the said telescopic drive rack and the said telescopic guided slider both glides in synchronization along the main shaft. The center post is rotationally connected to the main shaft, and axially positioned at the lower end of the center frame, so that the center post can glide in sync with the center frame along the main shaft, at the same time the center post can rotate relative to the center frame, achieving independent telescopic control In the adjustable wall mount of the present invention of the said flat panel television, there is the telescopic rack on the said telescopic drive rack, there is corresponding telescopic pinion (not shown in figure) to the said telescopic rack on the said telescopic drive, the said telescopic drive in combination with the telescopic rack and pinion drives the said telescopic drive rack to glide on the main shaft. So that while the center post rotates relative to the center frame, the telescopic drive rack can still actuate the telescopic guided slider to travel up and down the main shaft.

In the adjustable wall mount of the present invention of the said flat panel television, it includes a pan mechanism, the said pan mechanism includes the panning slot plate, the pan drive assembly, and the pan mount that is rotationally connected to the said main shaft; the said pan drive assembly, the pan mount, and the said center post all rotate in sync; the said pan drive assembly actuates the panning slot plate to glide relative to the pan drive assembly that is moving the pan drive assembly to rotate relative to the main shaft; the point of connection of the said flat panel television is on the said pan mount. The pan mount is rotationally connected to the main shaft. When the pan drive assembly activates the panning slot plate to glide relative to the center frame, the pan drive assembly also activates the pan mount and the center post to rotate in sync, thereby the flat panel television can rotate on the main shaft relative to the center frame, this will allow adjusting of the panning angle of the flat panel television, to get the best viewing angle. At the same time the center post can move in sync with the pan mount, realizing the pan and extension/retraction control separately, so that it is easier to set. Besides that, the weight of the flat panel television is supported by the main shaft through the pan mount, which means the pan drive only needs to output a small torque to activate the panning slot plate relative to the pan mount when controlling the panning motion.

In the adjustable wall mount of the present invention of the said flat panel television, there is the positioning convex post on the said center frame with its convex element towards the said panning slot plate; the said pan drive assembly includes the pan drive plate that is rotationally connected to the said main shaft and moves in sync with the said center post, the pan drive device that is attached to the said pan drive plate; the convex guide post on the said pan drive plate with its convex element towards the said panning slot plate, there is the main shaft slot that corresponds to the said main shaft on the said panning slot plate, the guided slot that matches to the said convex guide post, and the positioning slot that matches to the said positioning convex post.

In the adjustable wall mount of the present invention of the said flat panel television, there is the panning rack on the said panning slot plate, and the corresponding panning pinion to the said panning rack on the said pan drive device, when the said pan drive device actuates the panning rack and panning pinion together, the said panning slot plate in turn glides relative to the pan drive plate.

In the adjustable wall mount of the present invention of the said flat panel television, it includes the tilt adjustment mechanism, the said tilt adjustment mechanism includes the connecting plate assembly that is rotationally connected to the main shaft, the tilt guide frame with a sliding connection to the main shaft, the drive connecting rods have one end rotationally connected to the tilt guide frame and the other end rotationally connected to the connecting plate assembly, and the tilt drive device is attached to the said center post and actuates the said tilt guide frame to glide along the main shaft. The point of connection of the said flat panel television is on the said connecting plate assembly. The tilt guide frame actuates the drive connecting rods to glide along the main shaft; therefore the flat panel television that is connected to the connecting plate assembly also has an inclination change, thus allowing adjustment of the tilt angle of the flat panel television, to obtain an optimum viewing angle. As the tilt drive device is installed on the center post, the tilt guide frame and the telescopic guided slider are also independently connected on the main shaft, during the extension/retraction adjustment, the axial position of tilt guide frame will not change relative to the main shaft, that is the flat panel television tilt angle will not change; similarly during the tilt angle adjustment, the axial position of the telescopic guided slider will not change relative to the main shaft, that is there will not be any forward or backward movement of the flat panel television; realizing the goal of separating the tilt and extension system, so it is easier when adjustment is needed.

In the adjustable wall mount of the present invention of the said flat panel television, the upper positioning plate, upper connecting plate, mounting plate, lower connecting plate, and the lower positioning plate are successively rotationally connected to the said connecting plate assembly, the said upper positioning plate and the said lower positioning plate are rotationally connected to the main shaft and are axially positioned on the main shaft; one end of the said drive connecting rods are rotationally connected to the said tilt guide frame and the other end rotationally connected to the said mounting plate, the upper connecting plate, or the lower connecting plate; the said flat panel television is attached to the said mounting plate.

In the adjustable wall mount of the present invention of the said flat panel television, there is the tilt rack on the said tilt guide frame, there is corresponding tilt pinion that matches the said rack on the said tilt drive device, the said tilt drive device actuates the tilt guide frame to glide on the main shaft by the matching action of the tilt rack and tilt pinion.

In the embodiments of the adjustable wall mount of the said flat panel television, the advantages are as follows: When the telescopic drive actuates the telescopic guided slider to travel up or down relative to the center rack assembly, the lower end of the first strut and the upper end of the second strut will move towards or apart from each other; and because the first strut and the second strut are rotationally connected in the middle, therefore the upper end of the first strut and the lower end of the second strut will also move towards or apart from each other; as the upper end of the first strut is attached to the wall mounting plate and the lower end of the second strut has a rolling end in contact with the wall mounting plate, it allows the lower end of the second strut to roll up and down the wall mounting plate.

When the lower end of the first strut and the upper end of the second strut move towards each other, the lower end of the first strut and the upper end of the second strut will move away from the wall mounting plate on a level plane, therefore extending the flat panel television out; when the lower end of the first strut and the upper end of the second strut moves apart from each other, the lower end of the first strut and the upper end of the second strut will move towards the wall mounting plate on a level plane, therefore retracting the flat panel television back. This allows for an adjustable extension distance of the flat panel television, to achieve an optimum viewing distance; when the television is not in use, the flat panel television can collapse close to the wall, and when the television is in use or it is necessary to access the back for repair or for wiring purposes, the television can extend out, making it very convenient. Furthermore, as the flat panel television is attached to the center rack assembly and as the center rack assembly is attached to the wall mounting plate by the extendable frame, the weight of the flat panel television is supported by both the center rack assembly and the extendable frame; and when the telescopic adjustment mechanism is activated, it only needs to overcome the torque between the first strut and the second strut, the telescopic drive only needs to output a small torque to achieve this; and because the weight bearing and drive function are separated, the telescopic adjustment mechanism is more reliable, even if the telescopic adjustment mechanism fails, the flat panel television will remain secure to the wall mounting plate by the center rack assembly and the extendable frame, and not fall, ensuring it is safe to use.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 4b shows the exploded view of 4a;

DETAILED DESCRIPTION OF PREFERRED EMBODIMENTS

Figure 1:
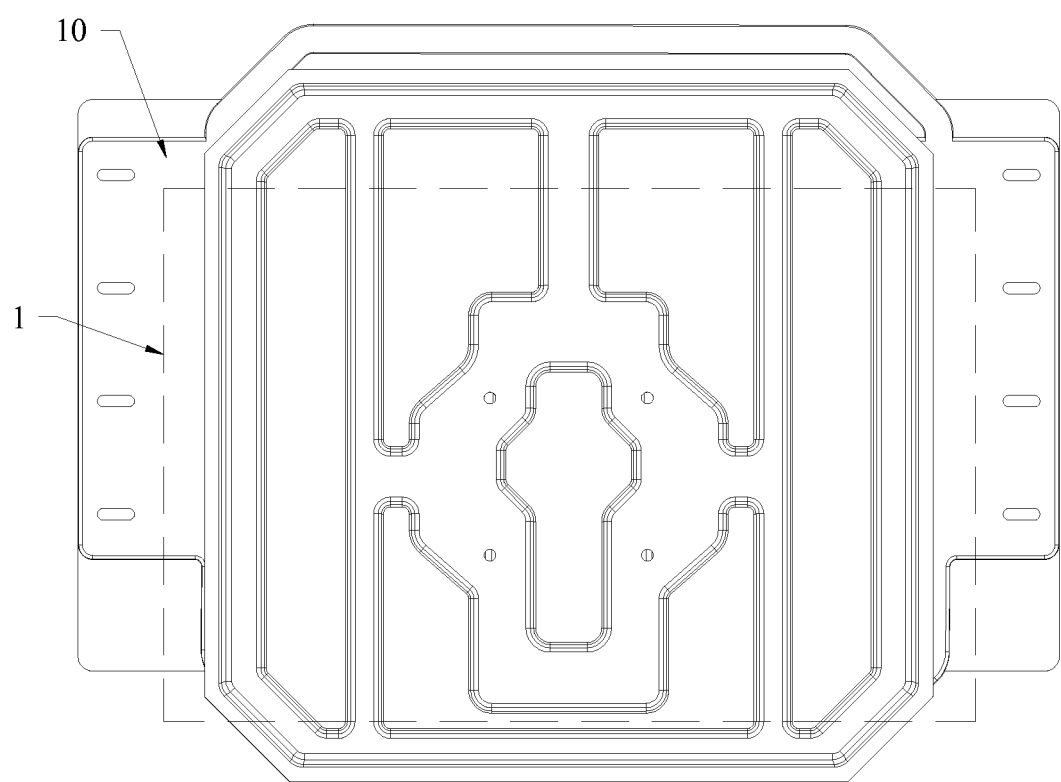
FIG. 1 shows the plan view of the embodiment of the adjustable wall mount of the said flat panel television of this invention.
Figure 2:
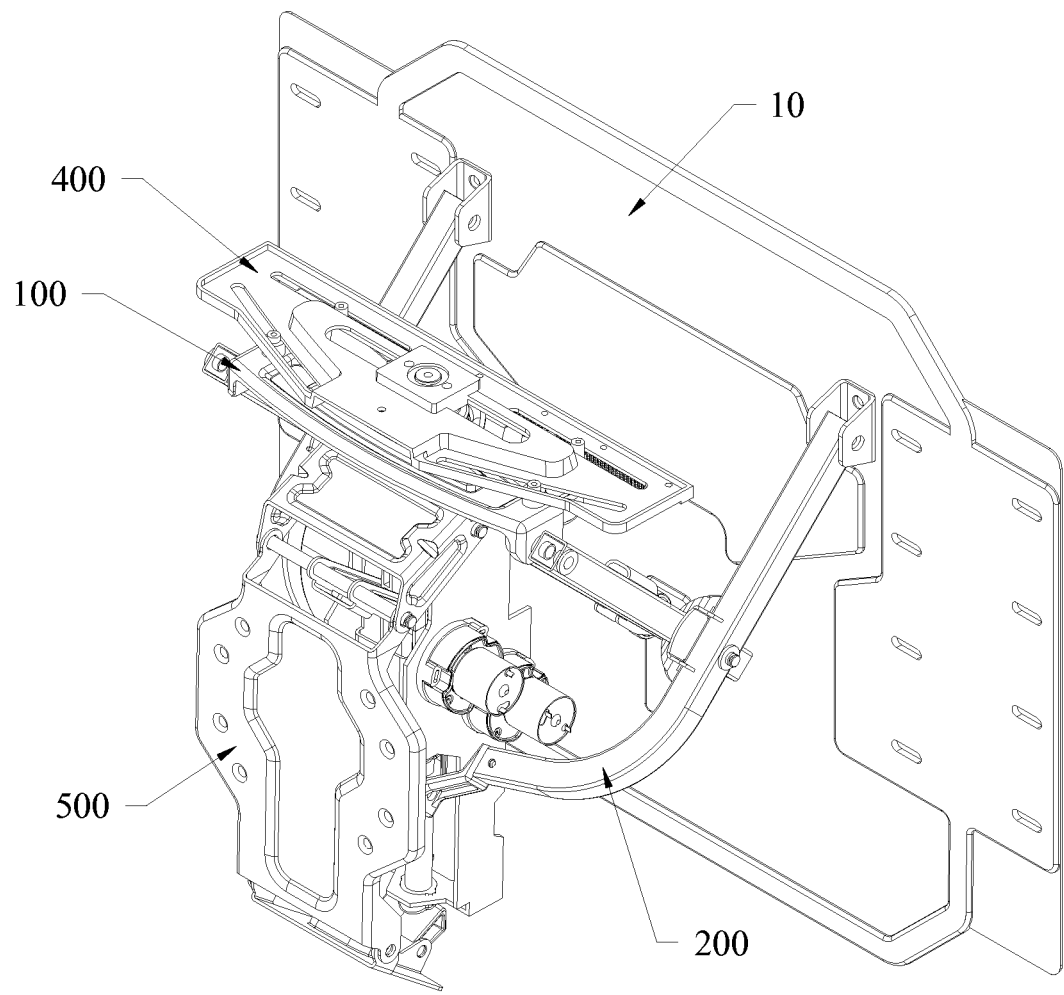
FIG. 2 shows the perspective view of the embodiment of the adjustable wall mount of the said flat panel television of this invention.
Figure 3:
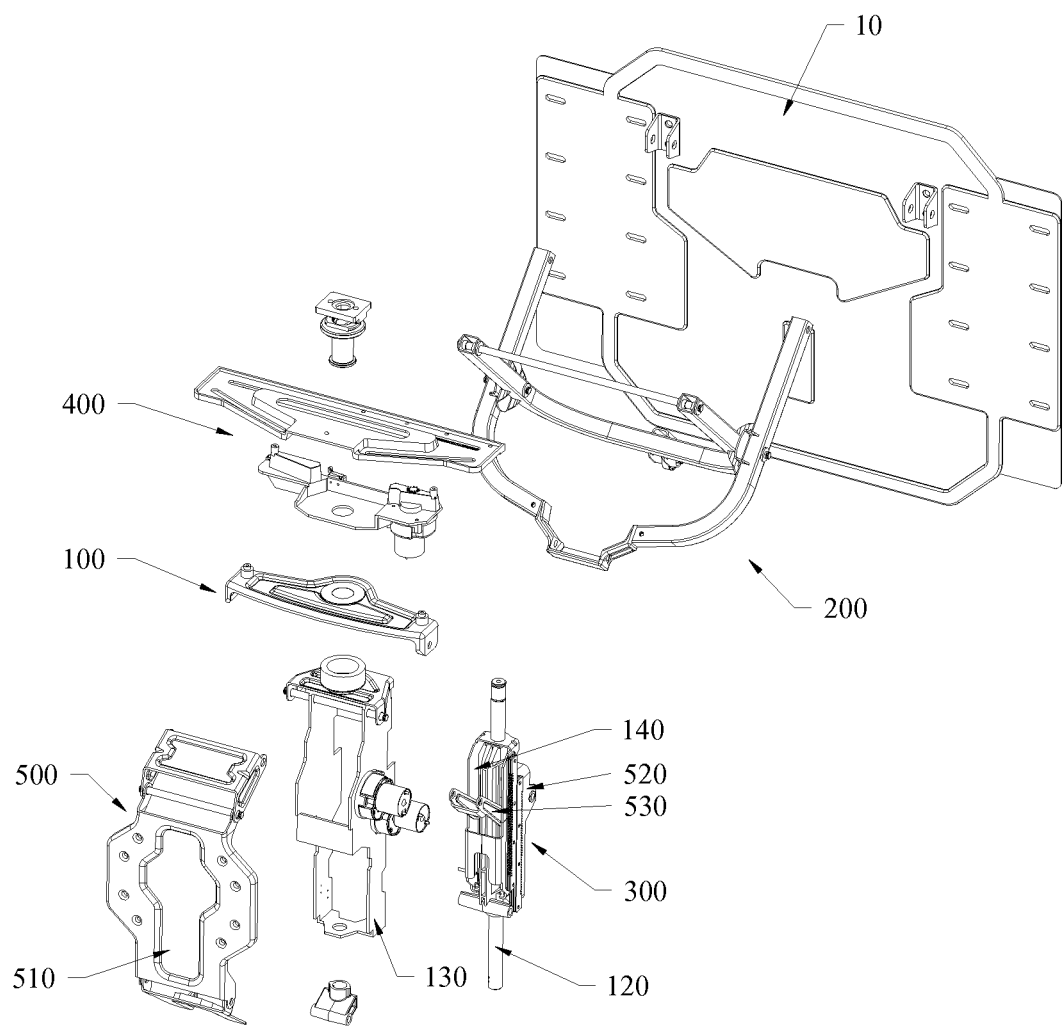
FIG. 3 shows the exploded view of the embodiment of the adjustable wall mount of the said flat panel television of this invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As FIGS. 1, 2, 3, 4a, 4b, 4c, and 4d show, the embodiment of the adjustable wall mount of the flat panel television of this invention includes the wall mounting plate 10 for securing it to the wall, the center rack assembly 100 that is attached to the flat panel television 1, both the extendable frame 200 and the telescopic adjustment mechanism 300 with one end attached to the wall mounting plate 10 and the other end attached to the center rack assembly 100. The extendable frame 200 includes the first strut 210 and the second strut 220 which are pivotally connected in the middle; the telescopic adjustment mechanism 300 includes the telescopic guided slider 310 which travels up and down relative to the center rack assembly 100 and the telescopic drive 320 that is attached to the center rack assembly 100 and activates the telescopic guided slider 310 which travels up and down relative to the center rack assembly 100; the upper end of the first strut 211 is pivotally connected to the wall mounting plate 10 while the lower end of the first strut 212 is rotationally installed at the lower end of the telescopic guided slider 310; the lower end of the second strut 222 rolls along the wall mounting plate 10 while the upper end of the second strut 221 is rotationally connected to the center rack assembly 100.

When the telescopic drive 320 actuates the telescopic guided slider 310 to travel up or down relative to the center rack assembly 100, the lower end of the first strut 212 and the upper end of the second strut 221 will move towards or apart from each other; and because the first strut 210 and the second strut 220 are rotationally connected in the middle, therefore the upper end of the first strut 211 and the lower end of the second strut 222 will also move towards or apart from each other; as the upper end of the first strut 211 is attached to the wall mounting plate 10 and the lower end of the second strut 222 has a rolling end in contact with the wall mounting plate 10, it allows the lower end of the second strut 222 to roll up and down the wall mounting plate 10.

To ensure that the flat panel television does not sway or tilt during extension or retraction, preferably the length of the first strut 210 and second strut 220 is the same, and the rotational connection point is set at the same position proportionally, such as the middle point.

Figure 4A:
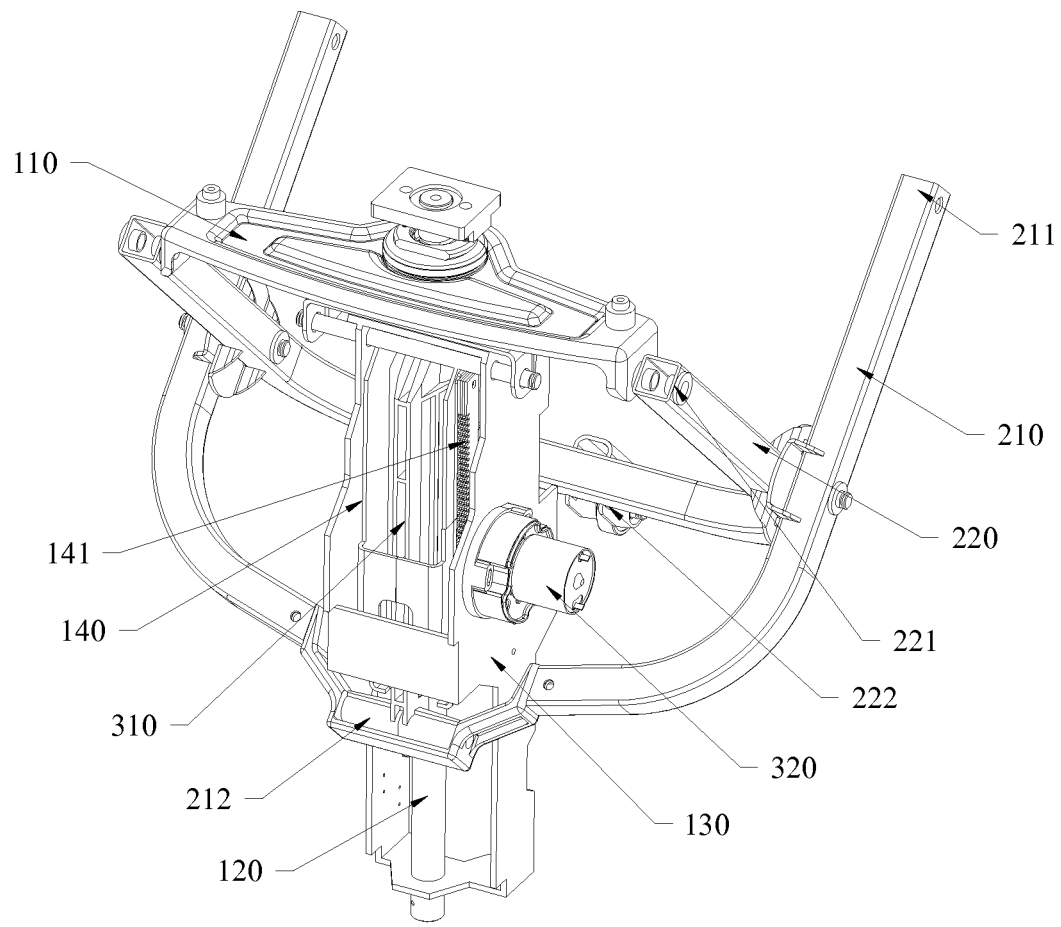
FIG. 4a shows the perspective view of the embodiment of the adjustable wall mount of the said flat panel television of this invention when in extension/retraction mode.
Figure 4B:
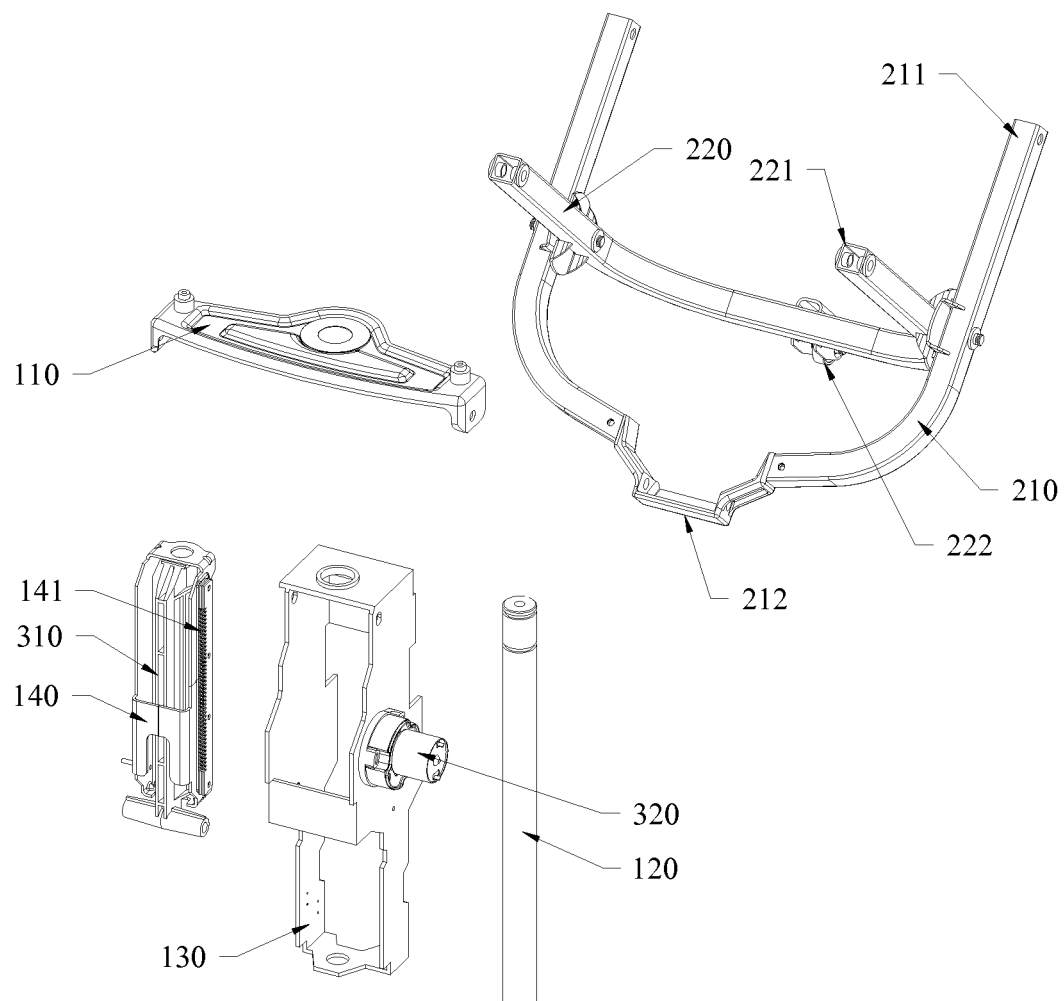
Figure 4C:
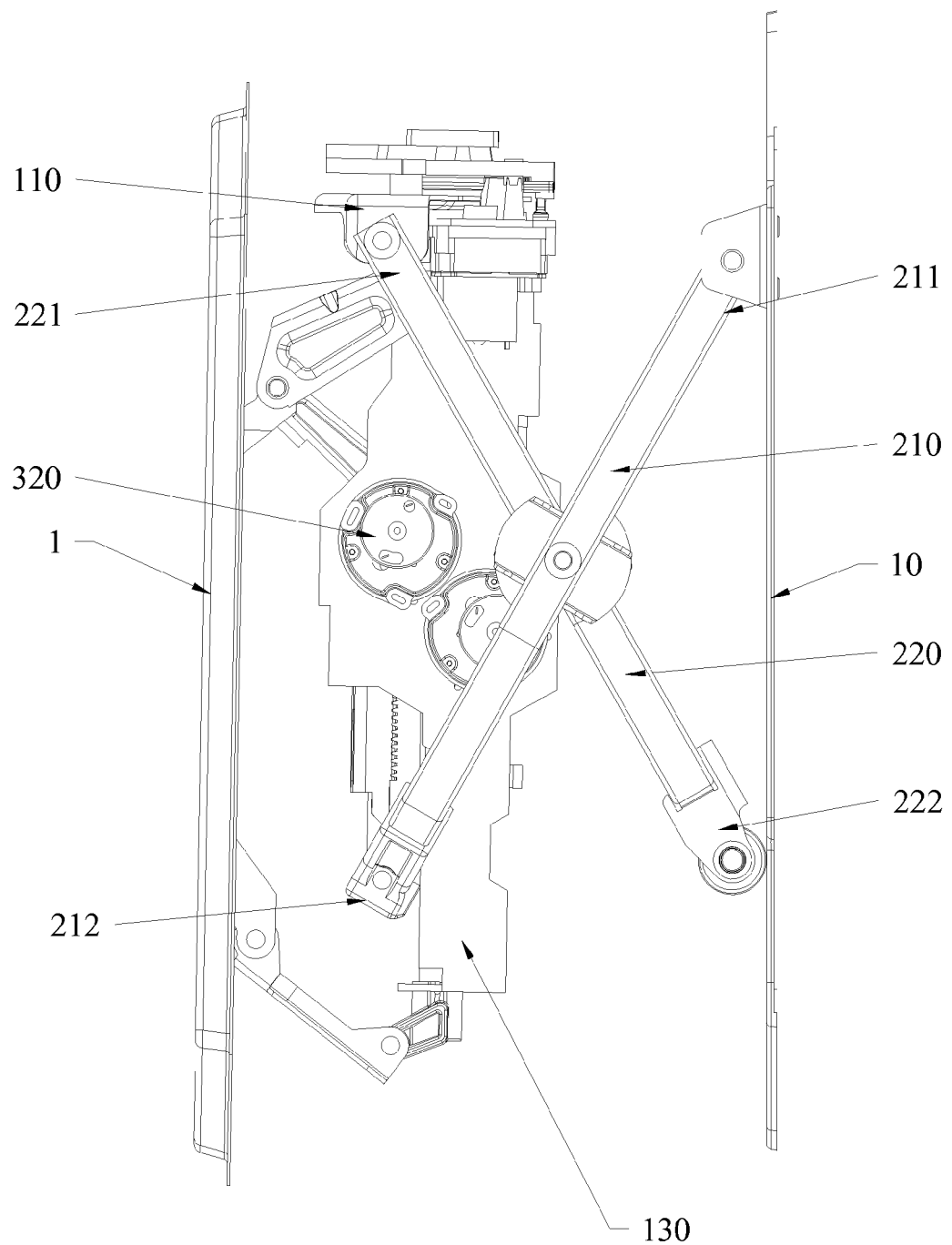
FIG. 4c shows the side view of the embodiment of the adjustable wall mount of the said flat panel television of this invention when it is fully retracted.
Figure 4D:
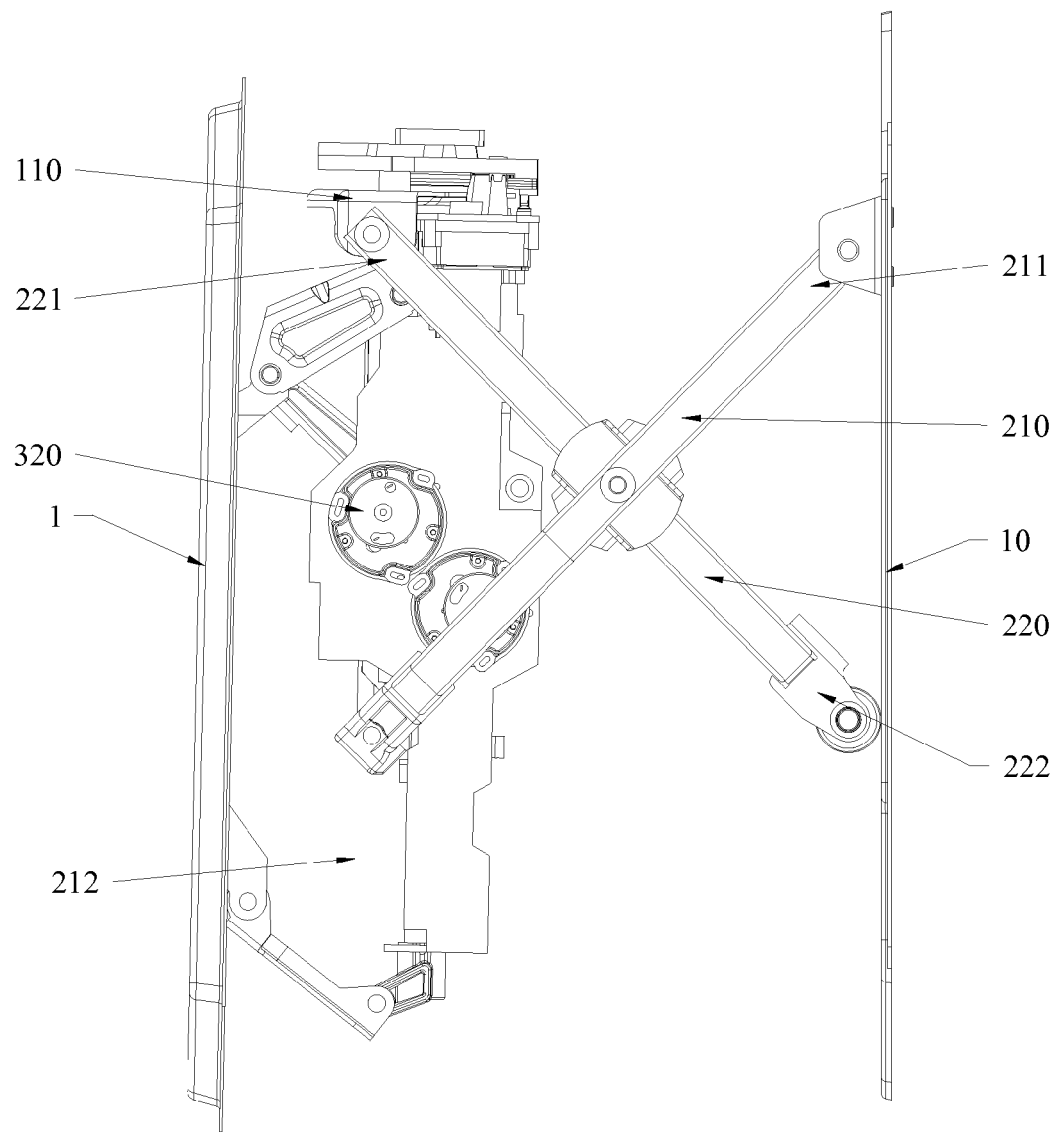
FIG. 4d shows the side view of the embodiment of the adjustable wall mount of the said flat panel television of this invention when it is fully extended.
Figure 5:
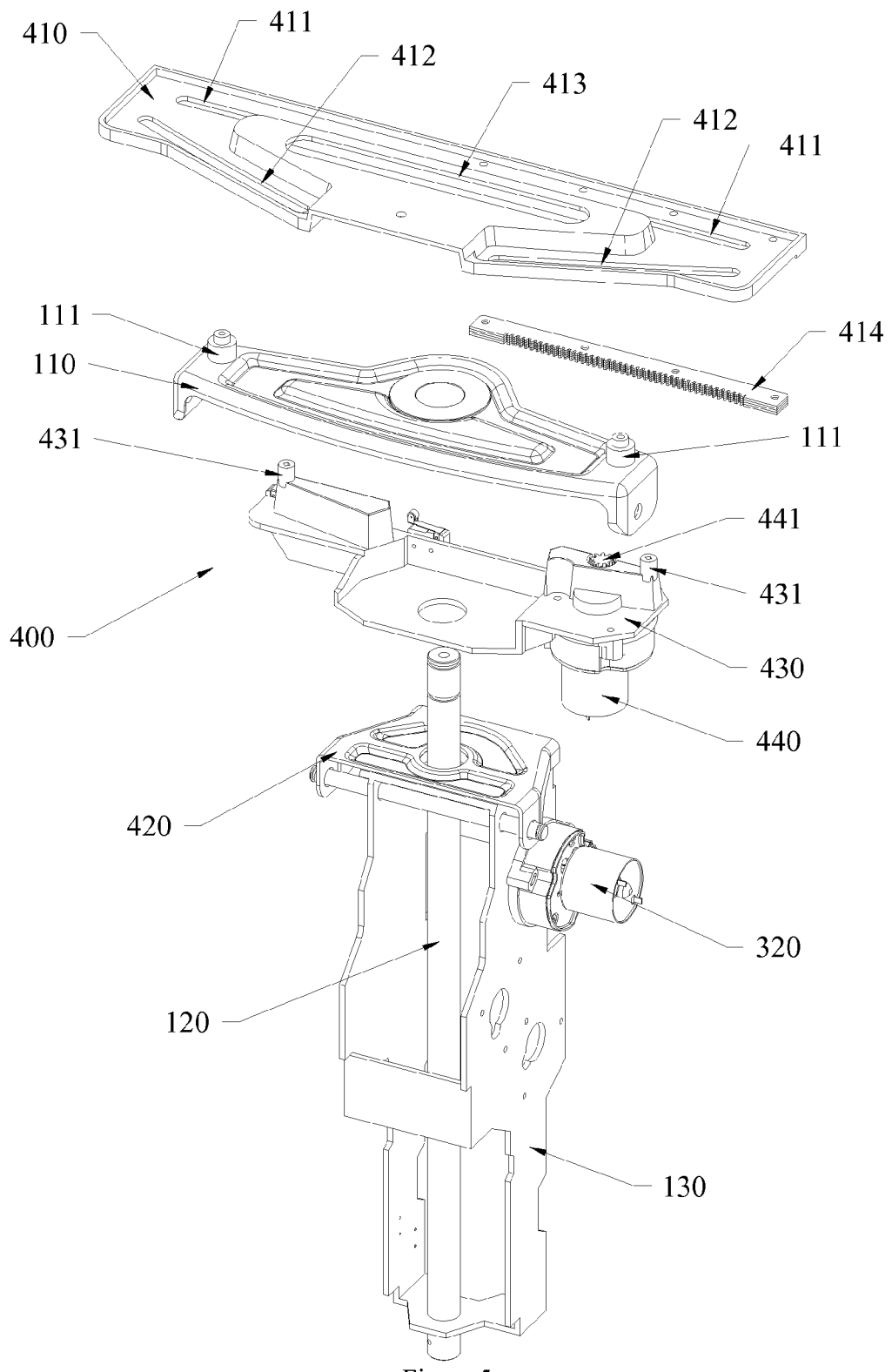
FIG. 5 shows the exploded view of the embodiment of the adjustable wall mount of the said flat panel television of this invention when it pans.
Figure 5A:
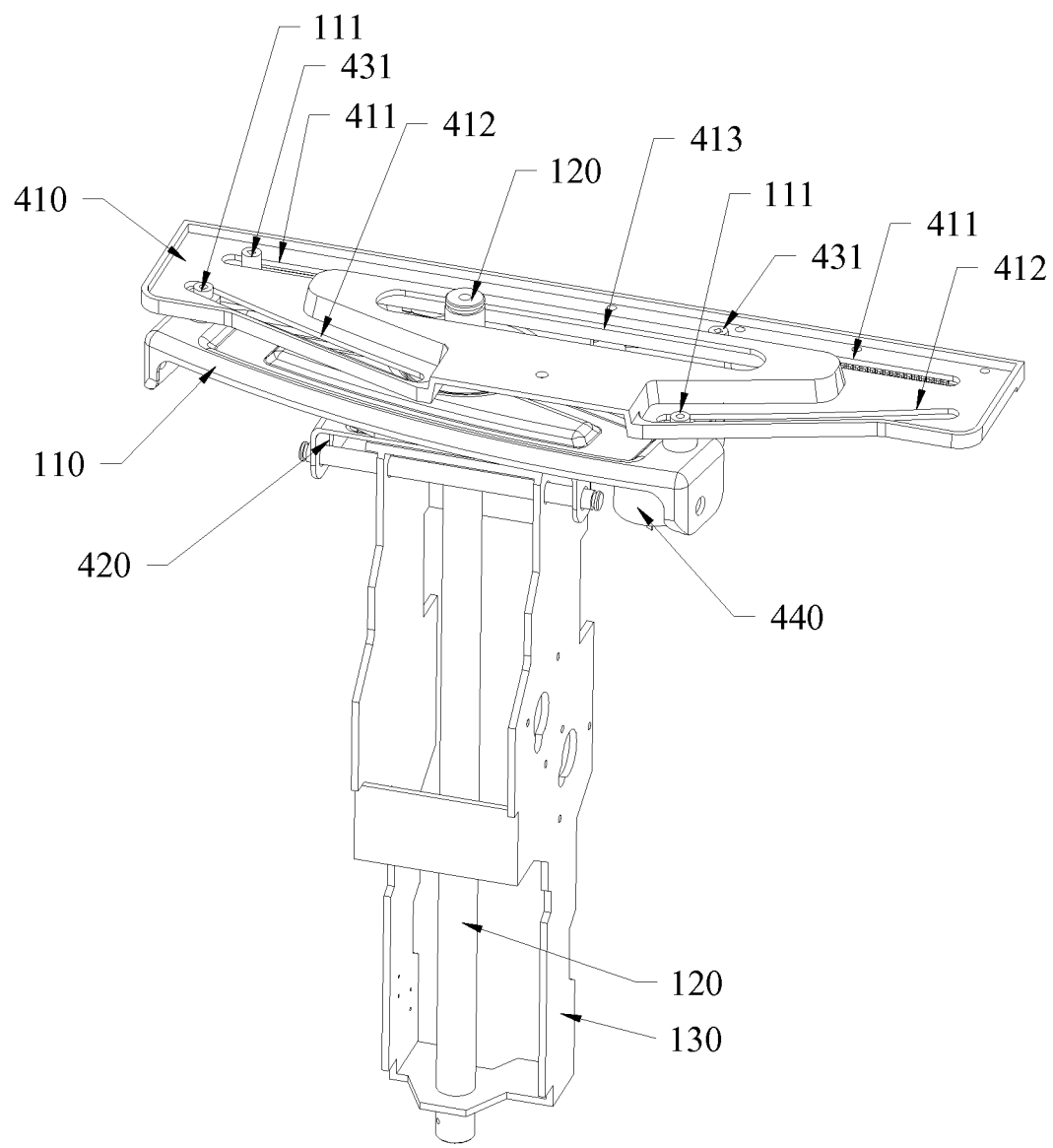
FIG. 5a shows the perspective view of the embodiment of the adjustable wall mount of the said flat panel television of this invention when it pans.
Figure 5B:
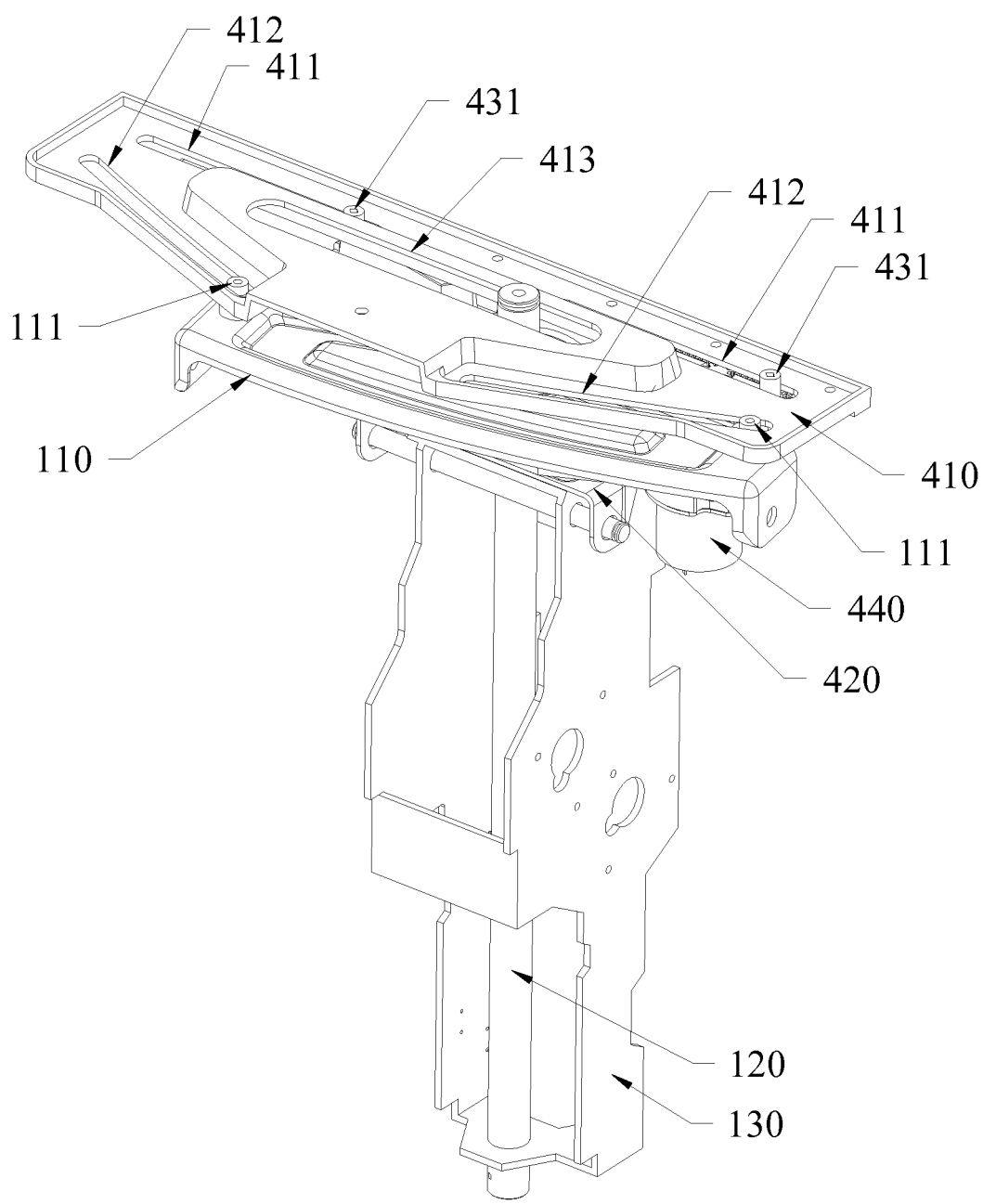
FIG. 5b shows another perspective view of the embodiment of the adjustable wall mount of the said flat panel television of this invention when it pans.
Figure 6:
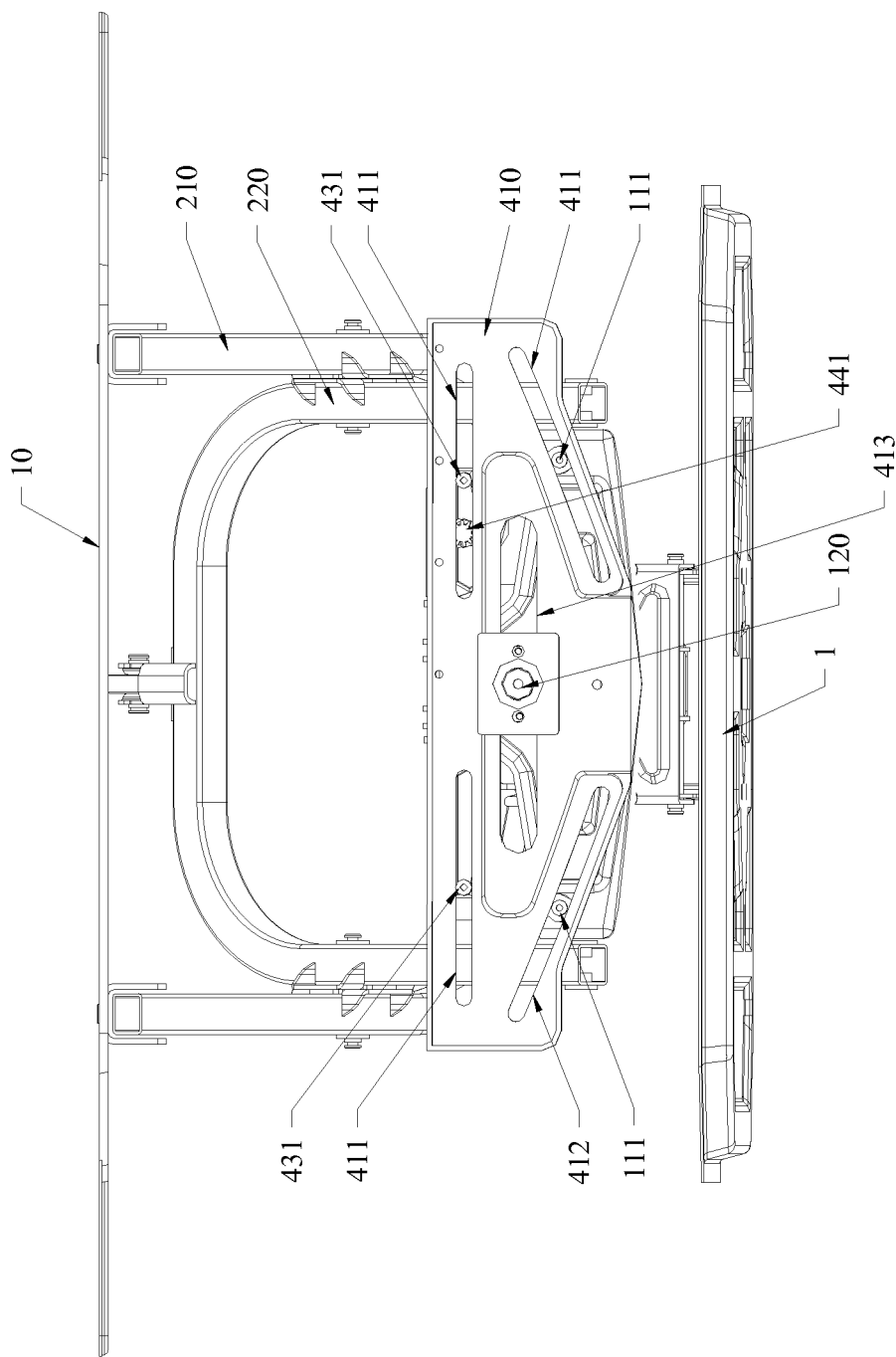
FIG. 6 shows the top view of FIG. 1.
Figure 6A:
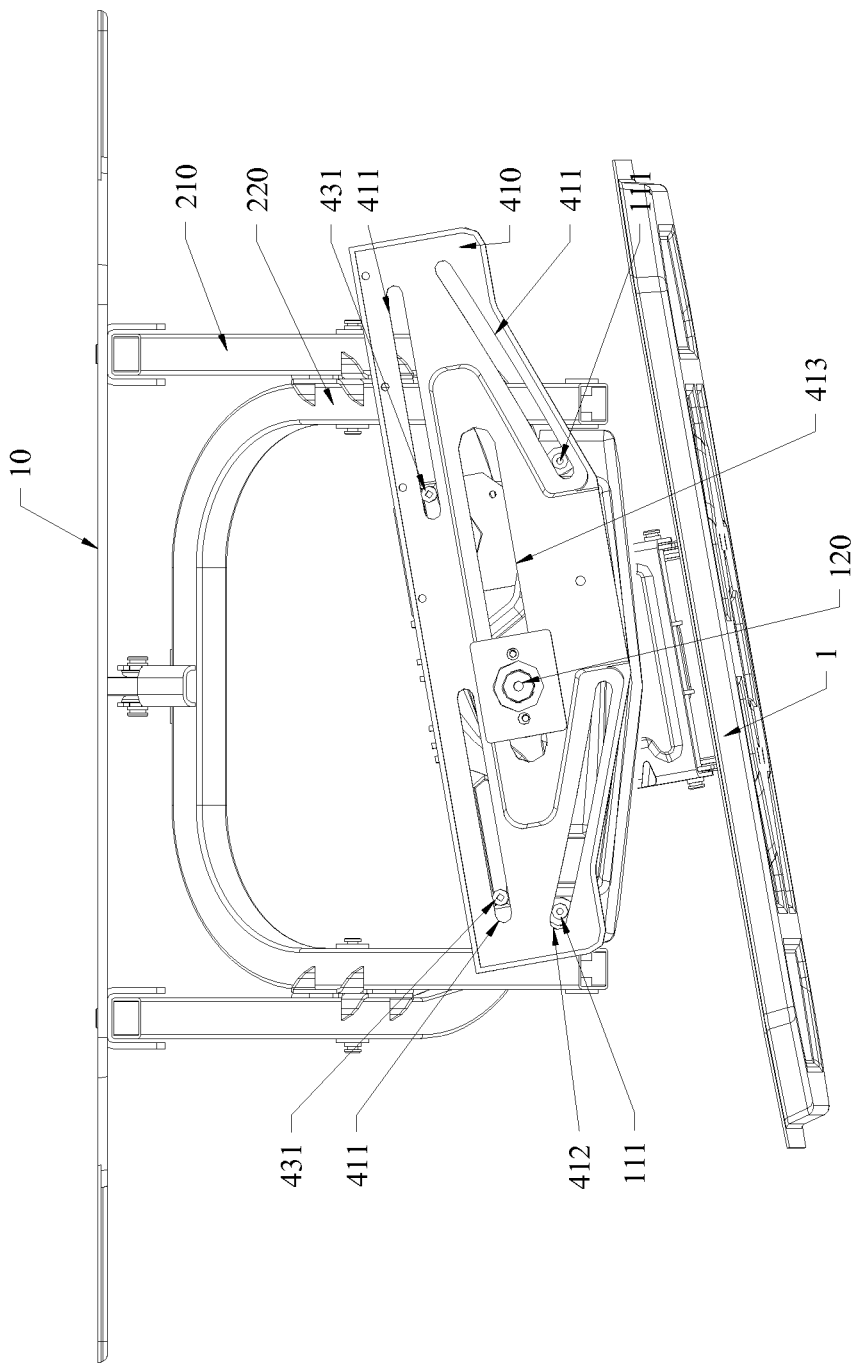
FIG. 6a shows the top view of the embodiment of the adjustable wall mount of the said flat panel television of this invention when it pans.
Figure 6B:
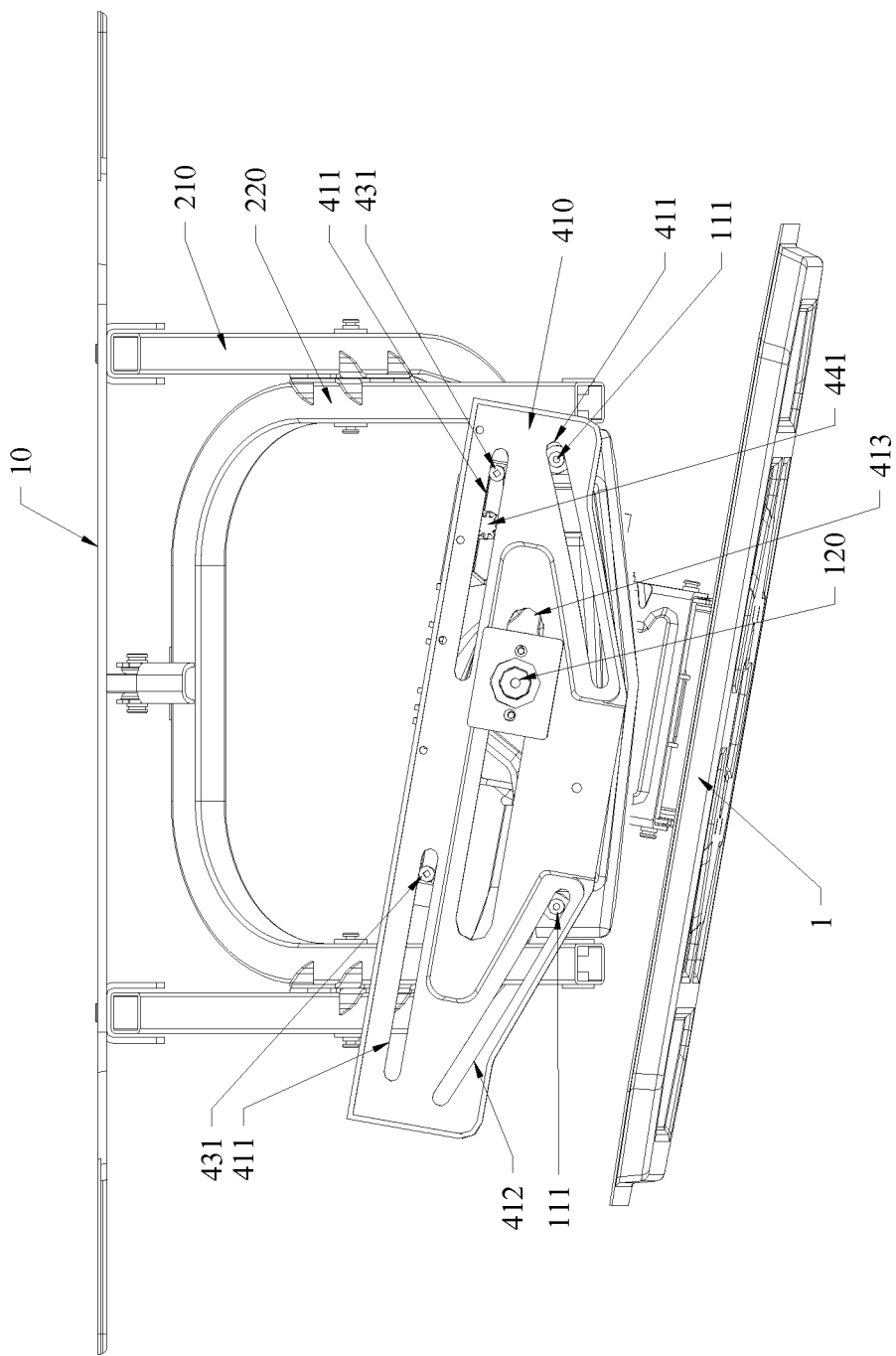
FIG. 6b shows another top view of the embodiment of the adjustable wall mount of the said flat panel television of this invention when it pans.
Figure 7:
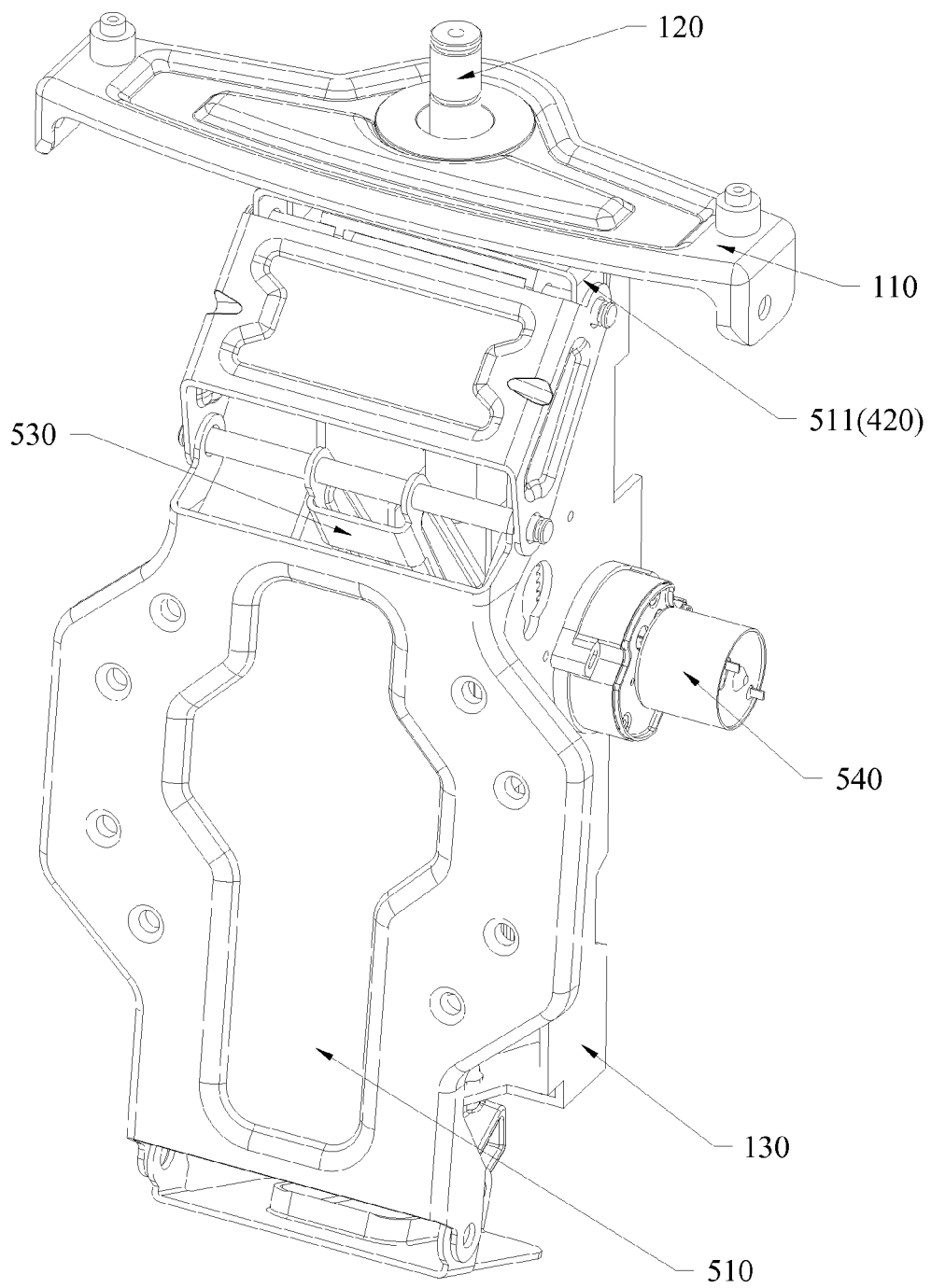
FIG. 7 shows the perspective view of the embodiment of the adjustable wall mount of the said flat panel television of this invention when it tilts.
Figure 7A:
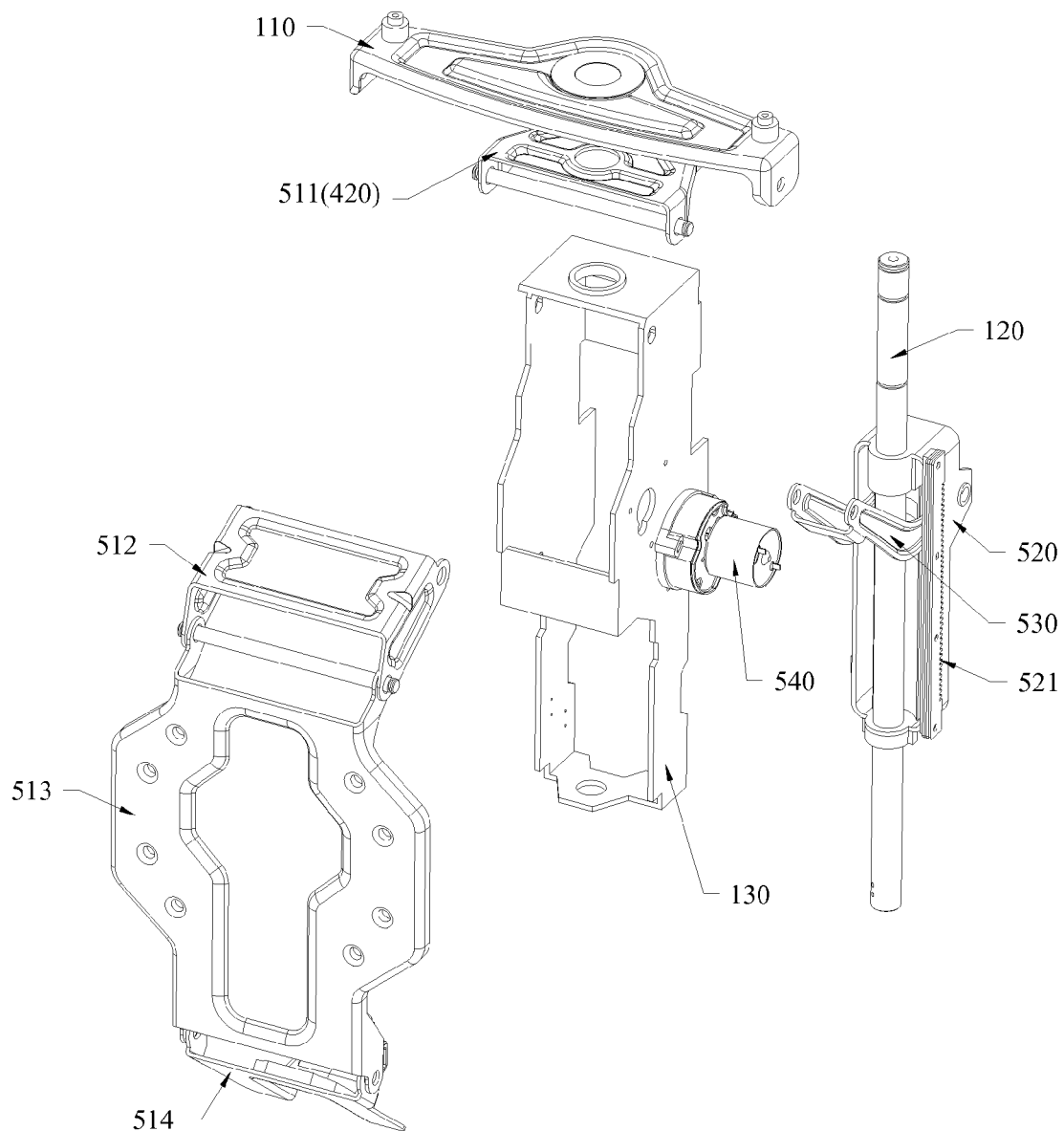
FIG. 7a shows the exploded view of FIG. 7.
Figure 7B:
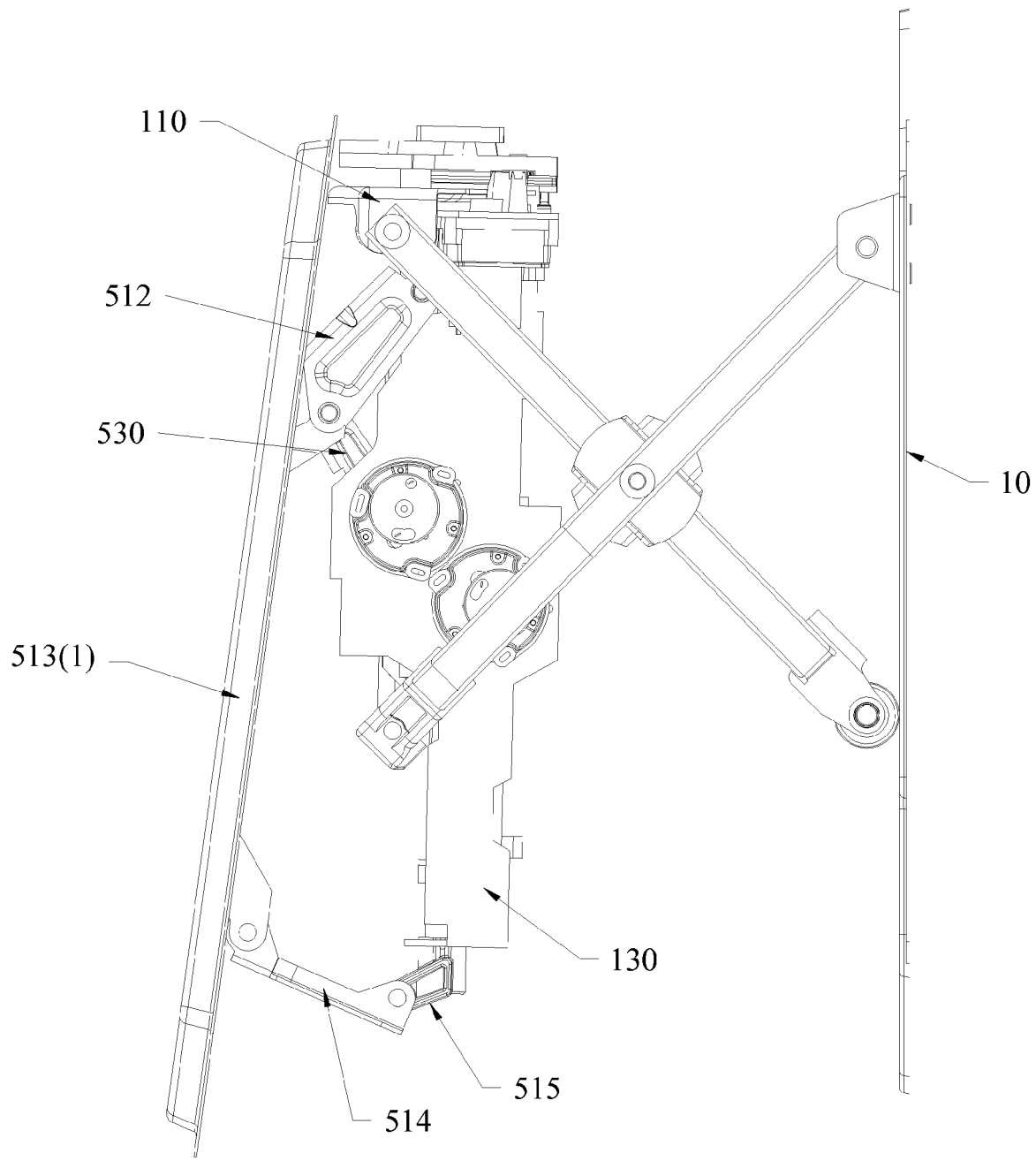
FIG. 7b shows the side view of the embodiment of the adjustable wall mount of the said flat panel television of this invention when it tilts up.
Figure 7C:
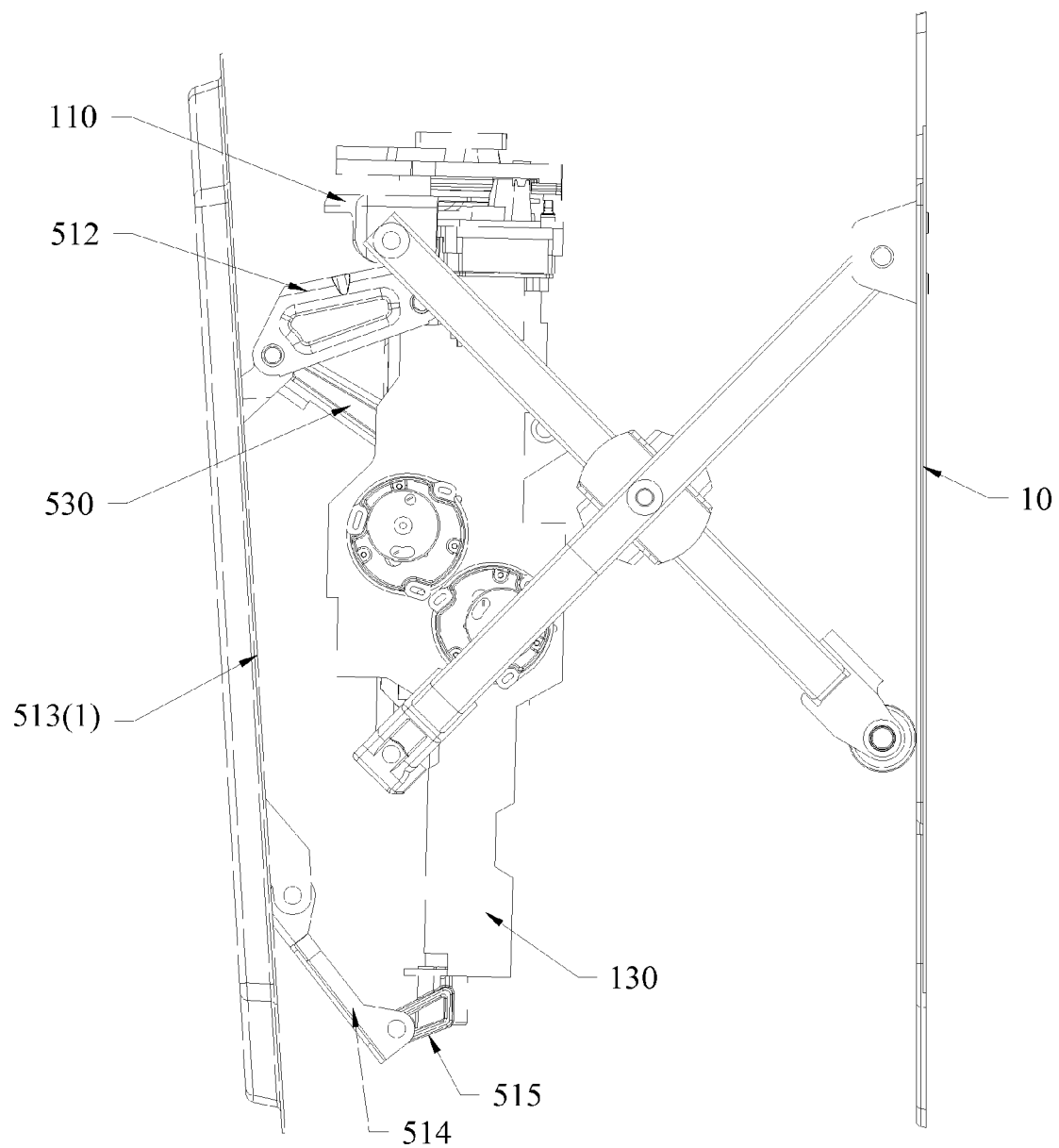
FIG. 7c shows the side view of the embodiment of the adjustable wall mount of the said flat panel television of this invention when it tilts down.

As FIG. 4d shows, when the lower end of the first strut 212 and the upper end of the second strut 221 move towards each other, the lower end of the first strut 212 and the upper end of the second strut 221 will move away from the wall mounting plate 10 on a level plane, therefore extending the flat panel television out.

As FIG. 4c shows, when the lower end of the first strut 212 and the upper end of the second strut 221 move apart from each other, the lower end of the first strut 212 and the upper end of the second strut 221 will move towards the wall mounting plate 10 on a level plane, therefore retracting the flat panel television back.

This allows the flat panel television's 1 extension distance to be adjustable, to achieve an optimum viewing distance; when the television is off the flat panel television can collapse close to the wall, when the television is on or there is a need to access the back for repair or for wiring purposes, the television can extend out, making it very convenient.

Furthermore, as the flat panel television is attached to the center rack assembly 100, and as the center rack assembly 100 is attached to the wall mounting plate 10 by the extendable frame 200, the weight of the flat panel television is supported by both the center rack assembly 100 and the extendable frame 200; and when the telescopic adjustment mechanism 300 is activated, it only needs to overcome the torque between the first strut 210 and the second strut 220, the telescopic drive 320 only needs to output a small torque to achieve this; and because the weight bearing and drive function are separated, the telescopic adjustment mechanism 300 is more reliable, even if the telescopic adjustment mechanism fails, the flat panel television will remain secure to the wall mounting plate 10 by the center rack assembly 100 and the extendable frame 200, and not fall, ensuring it is safe to use.

In this embodiment, preferably the center rack assembly 100 includes the center rack 110, and the main shaft 120. The center frame 110 and the upper end of the second strut 221 is rotationally connected, the vertical rotational connection of the main shaft 120 is on the center frame 110, and the shaft positioning member of the center frame 110 is on the upper end of main shaft 120, this way the main shaft 120 will not move in the axial direction relative to the center frame 110, thus the main shaft 120 is fixed vertically in position relative to the center frame 110. The telescopic guided slider 310 glides on the main shaft 120, that is the telescopic guided slider 310 follows the main shaft 120 and travels vertically up and down; the telescopic drive 320 is installed on the lower end of the center frame 110, specifically, the telescopic drive 320 is installed at the lower end of the center frame 110, this way the telescopic drive 320 and the center frame 110 is correspondingly positioned vertically; the point of connection on the flat panel television is mounted to the main shaft 120. When the telescopic drive 320 actuates the telescopic guided slider 310 along the main shaft 120, this then activates the extendable frame 200, which then controls how far or close the center frame 110 and the main shaft 120 is from the wall mounting plate 10, allowing the flat panel television that is connected to the main shaft 120 to extend out or retract back.

In this embodiment, it also includes the pan mechanism 400 and the tilt adjustment mechanism 500. When considering installing the pan mechanism 400 and the tilt adjustment mechanism 500, note that when the pan mechanism 400 or the tilt adjustment mechanism 500 is activated, it will not affect the extension/retraction control, therefore it is best to segregate telescopic adjustment mechanism 300, the pan mechanism 400, and the tilt adjustment mechanism 500. Therefore, preferably the center rack assembly 100 will include the center post 130 and the telescopic drive rack 140. In this, the center post 130 is rotationally connected to the main shaft 120, the shaft positioning member is at the lower end of the center frame 110, so that the center post 130 can rotate relative to the main shaft 120 but cannot move in the axial direction of the main shaft 120. The telescopic drive rack 140 is similarly rotationally connected to the main shaft 120 and moves in synchronization with the center post 130 around the main shaft 120, the telescopic drive rack 140 and the telescopic guided slider 310 can glide in synchronization along the main shaft 120, specifically, the telescopic drive rack 140 can install over the telescopic guided slider 310, and the top and bottom ends of both the telescopic drive rack 140 and the telescopic guided slider 310 can be positioned together, this will ensure that the telescopic drive rack 140 can rotate relative to the main shaft 120 and at the same time glide in sync with the telescopic guided slider 310 over the main shaft 120. Otherwise, by installing the telescopic drive rack 140 and the telescopic guided slider 310 inside the center post 130, it is possible to install corresponding rail and groove (not shown in figures), when the telescopic drive rack 140 actuates the telescopic guided slider 310 along the main shaft 120 up and down, the rail moves along the groove, when the center post 130 rotates on the main shaft 120, the telescopic drive rack will also follow suit because of the rail and groove connection. By installing the telescopic drive 320 on the center post 130, even if the center post 130 turns, the telescopic drive 320 can still actuate the telescopic guided slider 310 along the main shaft 120 up and down through the telescopic drive rack 140, realizing the goal of controlling the extension system.

In this embodiment, preferably to install telescopic rack 141 on the telescopic drive rack 140, to install the corresponding telescopic pinion (not shown in figure) to the telescopic rack 141 on the telescopic drive 320, the telescopic drive 320 in combination with the telescopic rack 141 and pinion drives the telescopic drive rack 140 to glide on the main shaft 120. This allows the center post 130 to still actuate the telescopic guided slider 310 to glide along the main shaft 120 by means of the telescopic drive rack 140, while the center post rotates relative to the center frame 110. Specifically, the telescopic drive 320 can be driven by a motor, by means of installing a drive circuit to control the motor, the control of the drive circuit can be done by remote control, this way the flat panel television 1 can be extended or refracted remotely, making it convenient for the user.

As FIGS. 1, 2, 3, 5, 5*a*, 5*b*, 6, 6*a*, and 6*b* show, in the adjustable wall mount of the flat panel television of this invention, it is possible to include a pan mechanism 400, the pan mechanism 400 includes the panning slot plate 410 that is rotationally connected to the main shaft 120, the pan drive assembly, and the pan mount 420. In this, the pan drive assembly, the pan mount 420, and the center post 130 all rotate in sync; the pan drive assembly activates the panning slot plate 410 to glide relative to the pan drive assembly, this then activates the pan drive assembly to rotate relative to the main shaft 120; the point of connection of the flat panel television 1 is on the pan mount 420.

As the pan mount 420 is rotationally connected to the main shaft 120, and the point of connection of the flat panel television 1 is on the pan mount 420, the flat panel television 1 is therefore connected to the main shaft 120 through the pan mount 420. When the pan drive assembly activates the panning slot plate 410 to glide relative to the center frame 110, the pan drive assembly also activates the pan mount 420 and the center post 130 to rotate in sync, thereby the flat panel television 1 can rotate on the main shaft 120 relative to the center frame 110, this will allow adjusting of the panning angle of the flat panel television 1, to get the best viewing angle. At the same time the center post 130 can move in sync with the pan mount 420, realizing the pan and extension/retraction control separately, so that it is easier to set. Besides that, the weight of the flat panel television 1 is supported by the main shaft 120 through the pan mount 420, which means the pan drive assembly only needs to output a small torque to activate the panning slot plate 410 relative to the pan mount 420 when controlling the panning motion.

In this embodiment, preferably the pan drive assembly also includes the pan drive plate 430 that is rotationally connected to the main shaft 120 and moves in sync with the center post 130, the pan drive device 440 that is attached to the pan drive plate 430; the convex guide post 431 with its convex element pointing towards the pan drive plate 430, at the same time there is the positioning convex post 111 on the center frame 110 with its convex element pointing to the panning slot plate 410; there is the main shaft slot 413 that corresponds to the main shaft 120 on the panning slot plate 410, the guided slot 411 that matches to the convex guide post 431, and the positioning slot 412 that matches to the positioning convex post 111. Specifically, the panning rack 414 can be installed on the panning slot plate 410, and the corresponding panning pinion 441 can be installed to the panning rack 414 on the pan drive device 440, when the pan drive device 440 actuates the panning pinion 441 to rotate, the panning pinion 441 glides along the corresponding panning rack 414, in turn the panning slot plate 410 glides relative to the pan drive plate 430; within this assembly the pan drive device 440 can be a motor drive, similarly the control of the drive circuit can be done by remote control.

As the main shaft 120 glides in the main shaft slot 413, the guided convex post 431 also glides in the guided slot 411, but the distance from the guided convex post 431 to panning pinion 441 is not the same as the distance from the panning pinion 441 to the main shaft 120, this allows the panning slot plate 410 to pan relative to the panning pinion 441 and at the same time rotates around the panning pinion 441, resulting in relative rotation of the pan drive plate 430; as the positioning convex post 111 on the center frame 110 glides in the positioning hole 412, the center frame 110 is fixed in the level plane, resulting in the panning slot plate 410 to rotate around the main shaft 120, that is the panning slot plate 410 moves from the three combination movements described above, so that the panning slot plate 410 in turn activates the pan drive plate 430 to rotate around the main shaft 120, which in turn activates the pan mount 420 to rotate around the main shaft 120, so that the flat panel television 1 can pan around main shaft 120. In addition, when the center post 130 and the pan mount 420 rotates in sync around the main shaft 120, the telescopic drive 320 can still extend or retract the flat panel television 1, realizing the goal of separating the control of the panning and the extension system.

As FIGS. 1, 2, 3, 7, 7*a*, 7*b*, and 7*c* show, in this embodiment of the adjustable wall mount of the said flat panel television of this invention, it also includes the tilt adjustment mechanism 500, the tilt adjustment mechanism 500 includes the connecting plate assembly 510 that is rotationally connected to the main shaft 120, the tilt guide frame 520 has a sliding connection to the main shaft 120, the drive connecting rods 530 have one end rotationally connected to the tilt guide frame 520 and the other end rotationally connected to the connecting plate assembly 510, the tilt drive device 540 is attached to the center post 130 and actuates the tilt guide frame 520 to glide along the main shaft 120. Furthermore, the point of connection of the flat panel television 1 is on the connecting plate assembly 510, one end of the connecting plate assembly 510 can be attached to the pan mount 420 or the center post 130, so that the flat panel television 1 is rotationally connected to the main shaft 120 by the connecting plate assembly 510. The tilt guide frame 520 actuates the drive connecting rods 530 to glide along the main shaft 120; therefore the flat panel television 1 that is connected to the connecting plate assembly 510 also has an inclination change, thus allowing adjustment of the tilt angle of the flat panel television 1, to obtain an optimum viewing angle. As the tilt drive device 540 is installed on the center post 130, the tilt guide frame 520 and the telescopic guided slider 310 are also independently connected on the main shaft 120, during the extension/retraction adjustment, the axial position of tilt guide frame 520 will not change relative to the main shaft 120, that is the flat panel television 1 tilt angle will not change; similarly during the tilt angle adjustment, the axial position of the telescopic guided slider 310 will not change relative to the main shaft 120, that is there will not be any forward or backward movement of the flat panel television; realizing the goal of separating the tilt and extension system, so it is easier when adjustment is needed.

Specifically, preferably the upper positioning plate 511, upper connecting plate 512, mounting plate 513, lower connecting plate 514, and the lower positioning plate 515 are successively rotationally connected to the connecting plate assembly 510; specifically, the connecting plate assembly 510 and all the above plates can be successively and rotationally connected with the shaft, all the shaft connections are on the same level setting, so that all the above plates rotate on the same vertical plane. In this, the upper positioning plate 511 and the lower positioning plate 515 are rotationally connected to the main shaft 120 and are axially positioned on the main shaft 120, so that the whole connecting plate assembly 510 can spin around the main shaft 120. One end of the drive connecting rods 530 have a movable connection to the tilt guide frame 520 and the other end connected to mounting plate 513, the flat panel television 1 is attached to the mounting plate 513, when the tilt guide frame 520 glides up and down, the distance between the mounting plate 513 and the main shaft 120 changes because of the drive connecting rods 530, as both the ends of the mounting plate 513 is limited by the upper connecting plate 512 and the lower connecting plate 514, so that the mounting plate 513 can only travel in the vertical plane, thereby adjusting the tilt angle of the flat panel television 1, and realizing the goal of controlling the pitch.

In this embodiment, preferably the pan mount 420 works as the upper positioning plate 511, that is the upper connecting plate 512 and the pan mount 420 is rotationally connected together; the upper connecting plate 512, the pan mount 420, and the center post 130 are all rotationally connected by the shaft, so that all three move in sync around the main shaft 120, and the axial position is from the upper main shaft 120 to the lower end of the center frame 110. Preferably the lower positioning plate 515 is rotationally connected to the lower end of the main shaft 120, so that the lower positioning plate 515 is positioned at the lower end of the main shaft 120.

In the adjustable wall mount of the said flat panel television of this invention, there is the tilt rack 521 on the tilt guide frame 520, there is corresponding tilt pinion (not shown in figures) that matches the rack on the tilt drive device 540, the tilt drive device 540 actuates the guide frame 520 to glide on the main shaft 120 by the matching action of the tilt rack 521 and tilt pinion, thus realizing the goal of controlling the pitch of the flat panel television 1. Similarly the control of the drive circuit can be done by remote control.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An adjustable wall mount for a flat panel television, comprising:
    a. a wall mounting plate for securing the wall mount to a wall;
    b. a center rack assembly attached to the flat panel television, said center rack assembly comprises:
        i. a center frame rotationally connected to said upper end of said second strut; and
        ii. a main shaft connected to said center frame vertically;
        iii. a center post rotationally connected to said main shaft and positioned axially to the lower end of said center frame; and
        v. a telescopic drive rack rotationally connected to said main shaft and rotates in sync with said center post;
    c. an extendable frame having a first strut and a second strut which are pivotally connected together; and
    d. a telescopic adjustment mechanism with one end attached to said wall mounting plate and the other end attached to said center rack assembly, said telescopic adjustment mechanism comprises:
        i. a telescopic guided slider which travels up and down said center rack assembly; and
        ii. a telescopic drive attached to said center rack assembly and drives said telescopic guided slider up and down relative to the said center rack assembly;
    wherein said center frame is connected on an upper end of said main shaft, said telescopic guided slider connecting to said main shaft and glides up and down relative to said center frame, said telescopic drive is connected to a lower end of said center frame, and the flat panel television is adapted to connect to said main shaft;
    wherein said telescopic guided slider is positioned within said center post, said telescopic drive is positioned on said center post, and said telescopic drive rack and said telescopic guided slider both glide in synchronization along said main shaft; and
    wherein an upper end of said first strut is pivotally connected to said wall mounting plate and a lower end of said first strut is rotationally installed at a lower end of said telescopic guided slider, and a lower end of the said second strut rolls along said wall mounting plate while an upper end of said second strut is rotationally connected to said center rack assembly.

2. The adjustable wall mount for a flat panel television of claim 1, wherein said telescopic drive rack comprises:
    i. a telescopic rack; and
    ii. a telescopic pinion corresponding to said telescopic rack;
    wherein said telescopic drive rack is driven as a result of the combination of said telescopic rack and said telescopic pinion gliding on said main shaft.

3. The adjustable wall mount for a flat panel television of claim 1 further comprising:
    e. a pan mechanism comprises:
        i. a panning slot plate;
        ii. a pan drive assembly; and
        iii. a pan mount that is rotationally connected to said main shaft;

wherein said pan drive assembly and said pan mount are rotatable in sync with said center post, said panning slot plate is driven by said pan drive assembly to glide relative to said pan drive assembly, allowing said pan drive assembly to rotate relative to said main shaft, and the flat panel television is adapted to connect to said pan mount.

4. The adjustable wall mount for a flat panel television of claim 3, wherein said center frame comprises:
  i. a positioning convex post with a convex element pointing to said panning slot plate;
wherein said pan drive assembly comprises:
  ii. a pan drive plate rotationally connected to said main shaft and moves in sync with said center post; and
  iii. a pan drive device attached to said pan drive plate;
wherein said pan drive plate comprises:
  iv. a convex guide post pointing towards said panning slot plate;
wherein said panning slot plate comprises:
  v. a guided slot corresponding to said convex guide post; and
  vi. a positioning slot corresponding to said positioning convex post.

5. The adjustable wall mount for a flat panel television of claim 4, wherein said panning slot plate further comprises:
  i. a panning rack;
wherein said pan drive device comprises:
  ii. a panning pinion corresponding to said panning rack, wherein said pan drive device actuates said panning rack and said panning pinion together, allowing said panning slot plate to in turn glides relative to said pan drive plate.

6. The adjustable wall mount for a flat panel television of claim 1 further comprising:
  f. a tilt adjustment mechanism comprises:
    i. a connecting plate assembly that is rotationally connected to said main shaft;
    ii. a tilt guide frame connecting to said main shaft;
    iii. a drive connecting rod having one end rotationally connected to said tilt guide frame and the other end rotationally connected to said connecting plate assembly; and
    iv. a tilt drive device attaching to said center post;
wherein said tilt guide frame is driven to glide along said main shaft, and said flat panel television is adapted to connect to said connecting plate assembly.

7. The adjustable wall mount for a flat panel television of claim 6, wherein said connecting plate assembly comprises:
  i. an upper positioning plate;
  ii. an upper connecting plate rotationally connected to said upper positioning plate;
  iii. a mounting plate rotationally connected to said upper connecting plate;
  iv. a lower connecting plate rotationally connected to said mounting plate; and
  v. a lower positioning place rotationally connected to said lower connecting plate;
wherein said upper positioning plate and said lower positioning plate are rotationally connected to said main shaft and fixed in an axial position relative to said main shaft, one end of said drive connecting rod is rotationally connected to said tilt guide frame and the other end rotationally connected to said mounting plate and said upper connecting plate or said lower connecting plate, and said flat panel television is adapted to attach to said mounting plate.

8. The adjustable wall mount for a flat panel television of claim 6, wherein said tilt guide frame comprises:
  i. a tilt rack;
said tilt drive device comprises:
  ii. a tilt pinion that matches said tilt rack;
wherein said tilt drive device actuates said guide frame to glide on said main shaft by the matching action of said tilt rack and said tilt pinion.

* * * * *